United States Patent
Dong et al.

(10) Patent No.: US 11,561,859 B2
(45) Date of Patent: Jan. 24, 2023

(54) METHOD, DEVICE AND COMPUTER PROGRAM PRODUCT FOR MANAGING DATA

(71) Applicant: EMC IP Holding Company LLC, Hopkinton, MA (US)

(72) Inventors: Jibing Dong, Beijing (CN); Xinlei Xu, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 16/831,328

(22) Filed: Mar. 26, 2020

(65) Prior Publication Data
US 2020/0341846 A1    Oct. 29, 2020

(30) Foreign Application Priority Data
Apr. 29, 2019    (CN) .......................... 201910354638.8

(51) Int. Cl.
*G06F 11/10*    (2006.01)
*G06F 3/06*    (2006.01)

(52) U.S. Cl.
CPC .......... *G06F 11/1092* (2013.01); *G06F 3/064* (2013.01); *G06F 3/0619* (2013.01); *G06F 3/0659* (2013.01); *G06F 3/0689* (2013.01); *G06F 11/1076* (2013.01)

(58) Field of Classification Search
CPC ............. G06F 11/1092; G06F 11/1076; G06F 3/0619; G06F 3/064; G06F 3/0659; G06F 3/0689; G06F 3/065; G06F 3/0622
See application file for complete search history.

(56) References Cited

U.S. PATENT DOCUMENTS

| | | | | |
|---|---|---|---|---|
| 5,742,752 A | * | 4/1998 | DeKoning | ........... G06F 11/1076 714/E11.034 |
| 6,092,215 A | * | 7/2000 | Hodges | ............... G06F 11/1076 714/E11.034 |
| 7,389,393 B1 | | 6/2008 | Karr et al. | |
| 8,578,094 B2 | | 11/2013 | Chambliss et al. | |
| 8,839,028 B1 | * | 9/2014 | Polia | .................... G06F 11/1088 714/6.24 |
| 8,996,908 B1 | * | 3/2015 | Nishino | ............... G06F 11/2071 714/6.24 |

(Continued)

*Primary Examiner* — Matthew M Kim
*Assistant Examiner* — Matthew N Putaraksa
(74) *Attorney, Agent, or Firm* — BainwoodHuang (57) ABSTRACT

Techniques for managing data involve receiving a write request to write a data block into a first stripe in a disk array, the write request comprising a first storage address for storing the data block. The techniques further involve determining, based on the first storage address, a first group of disks related to a data portion of the first stripe and a second group of disks related to a parity portion of the first stripe. The techniques further involve, in response to a first disk in the first group of disks being unavailable, storing a data sub-block related to the first disk into a first parity portion of the parity portion such that the data block is stored in the first stripe, the first parity portion being located at a second disk in the second group of disks. The techniques further involve returning a response to the write request, the response comprising a first indication indicating a status of the disks in the disk array.

13 Claims, 7 Drawing Sheets

(56) References Cited

U.S. PATENT DOCUMENTS

| | | | |
|---|---|---|---|
| 9,720,596 B1 | 8/2017 | Bono et al. | |
| 10,592,337 B1* | 3/2020 | Banerjee | G06F 3/0632 |
| 10,901,646 B2 | 1/2021 | Hutchison et al. | |
| 2010/0030945 A1* | 2/2010 | Yuan | G06F 12/0246 |
| | | | 711/E12.008 |
| 2013/0055013 A1* | 2/2013 | Seki | G06F 11/1092 |
| | | | 714/6.24 |
| 2014/0089730 A1* | 3/2014 | Watanabe | G06F 11/1092 |
| | | | 714/6.22 |
| 2014/0169092 A1* | 6/2014 | Miyamoto | G06F 11/1048 |
| | | | 365/185.05 |
| 2015/0378816 A1* | 12/2015 | Kawamura | G06F 3/0619 |
| | | | 714/766 |
| 2017/0123995 A1* | 5/2017 | Freyensee | G06F 11/2094 |
| 2019/0129797 A1* | 5/2019 | Ma | G06F 3/0644 |
| 2019/0220352 A1* | 7/2019 | Cha | G06F 3/0659 |
| 2020/0257590 A1* | 8/2020 | Bolkhovitin | H04L 67/104 |
| 2021/0349781 A1* | 11/2021 | Ki | G06F 11/1658 |
| 2022/0091937 A1* | 3/2022 | Baptist | G06F 11/1092 |
| 2022/0253357 A1* | 8/2022 | McShane | G06F 11/1435 |

\* cited by examiner

METHOD, DEVICE AND COMPUTER PROGRAM PRODUCT FOR MANAGING DATA

CROSS REFERENCE TO RELATED APPLICATION

This application claims priority to Chinese Patent Application No. CN201910354638.8, on file at the China National Intellectual Property Administration (CNIPA), having a filing date of Apr. 29, 2019, and having "METHOD, DEVICE AND COMPUTER PROGRAM PRODUCT FOR MANAGING DATA" as a title, the contents and teachings of which are herein incorporated by reference in their entirety.

FIELD

Embodiments of the present disclosure relate to the field of data storage, and specifically to a method, a device and a computer program product for managing data.

BACKGROUND

A Redundant Array of Independent Disks (RAID) is a disk group formed by combining a plurality of independent disks in different manners. From a user's point of view, the redundant array of independent disks is like one disk, but it can provide a higher storage capacity than a single hard disk, and can also provide data backup. When data of a disk extent is damaged, the damaged data can also be recovered with the data backup, thereby protecting security of the user's data. Different manners for forming a disk array are called RAID Levels, such as RAID0, RAID1, RAID5, and so on.

With development of RAID technologies, data reading and writing are performed at a level of disk slice rather than at a level of disk. According to this technique, each of the plurality of disks is divided into a plurality of disk slices. By creating a RAID in units of disk slices, more flexible disk management and I/O control are achieved, and operation performance of a system is improved. However, as price of storage disks decreases, more disks are used for storing data. Therefore, there is a problem about how to use more disks to store data in a RAID.

SUMMARY

Embodiments of the present disclosure provide a method, a device and a computer program product for managing data.

According to a first aspect of the present disclosure, there is provided a method of managing data. The method includes receiving a write request to write a data block into a first stripe in a disk array, the write request including a first storage address for storing the data block. The method further includes determining, based on the first storage address, a first group of disks related to a data portion of the first stripe and a second group of disks related to a parity portion of the first stripe, the data portion being used for storing data sub-blocks of the data block, and the parity portion being used for storing parity sub-blocks related to the data sub-blocks. The method further includes, in response to a first disk in the first group of disks being unavailable, storing a data sub-block related to the first disk into a first parity portion of the parity portion such that the data block is stored in the first stripe, the first parity portion being located at a second disk in the second group of disks. The method further includes returning a response to the write request, the response including a first indication indicating a status of the disks in the disk array to update the status of the disks related to the first stripe.

According to a second aspect of the present disclosure, there is provided an electronic device for data processing. The electronic device includes: a processor, a memory storing computer program instructions, the processor running the computer program instructions in the memory to control the electronic device to perform acts including: receiving a write request to write a data block into a first stripe in a disk array, the write request including a first storage address for storing the data block; determining, based on the first storage address, a first group of disks related to a data portion of the first stripe and a second group of disks related to a parity portion of the first stripe, the data portion being used for storing data sub-blocks of the data block, and the parity portion being used for storing parity sub-blocks related to the data sub-blocks; in response to a first disk in the first group of disks being unavailable, storing a data sub-block related to the first disk into a first parity portion of the parity portion such that the data block is stored in the first stripe, the first parity portion being located at a second disk in the second group of disks; and returning a response to the write request, the response including a first indication indicating a status of the disks in the disk array to update the status of the disks related to the first stripe.

According to a third aspect of the present disclosure, there is provided a computer program product. The computer program product is tangibly stored on a non-volatile computer-readable medium and includes machine-executable instructions. The machine-executable instructions, when executed, cause a machine to perform steps of the method according to the first aspect of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in example embodiments of the present disclosure.

Throughout the figures, the same or corresponding reference numbers represent the same or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more detail hereunder with reference to figures. Although figures show some embodiments of the present disclosure, it should be appreciated that the present disclosure may be implemented in many forms and the present disclosure should not be understood as being limited to embodiments illustrated herein. Rather, these embodiments are provided herein to enable more thorough and complete understanding of the present disclosure. It should be appreciated that figures and embodiments of the present disclosure are only used for purpose of illustration rather than limiting the protection scope of the present disclosure.

As used herein, the term "includes" and its variants are to be read as open terms that mean "includes, but is not limited to." The term "based on" is to be read as "based at least in part on." The term "an embodiment" or "the embodiment" is to be read as "at least one embodiment". Terms such as "first" and "second" may refer to different or identical objects. The text below might include other explicit and implicit definitions.

Principles of the present disclosure will be described with reference to several example embodiments shown in the figures. Although figures show preferred embodiments of the present disclosure, it should be appreciated that these embodiments are described only to enable those skilled in the art to better understand and thereby implement the present disclosure, not to limit the scope of the present disclosure in any manner.

When data in a disk array is processed, there might be cases in which a disk related to the disk array is unavailable due to certain circumstances. When this case happens, the unavailable disk will affect the disk array's ability to process data. Usually, if one disk in a group of disks related to the disk array is unavailable, the disk array will identify the disk. When a data block is written to a stripe in the disk array, the data block needs to be divided into data sub-blocks, wherein the stripe spans the group of disks. Parity sub-blocks are then obtained by XORing the data sub-blocks. The data sub-blocks are stored into a data portion of the stripe, and the parity sub-blocks are stored into a parity portion of the stripe. If the unavailable disk is used for storing data sub-blocks, the data block cannot be stored in the data portion of the stripe on the disk at this time. Only other data sub-blocks and parity sub-blocks are stored at this time. When data is read, if the read data is located on the unavailable disk, it is necessary to obtain other data sub-blocks and parity sub-blocks on the stripe related to the data. Then, the data is recovered by an XOR operation.

However, the above method may cause excessive input and output operations. For example, in a write operation, parity sub-blocks need to be calculated. When the read data is located on an unavailable disk, the read operation will first read data sub-blocks and parity sub-blocks located on other disks, and then perform a calculation for the abovementioned sub-blocks to obtain the data to be read. This greatly increases the number of input and output operations of the disk array and also consumes a large amount of processor resources.

In order to solve the above problems, various embodiments of the present disclosure propose a solution for managing data. According to various embodiments of the present disclosure, a disk storing data sub-blocks of a data block and a disk for storing parity sub-blocks of the data block are determined based on a storage address of the data block to be written. If the disk storing the data sub-blocks is unavailable, the data block to be stored on the unavailable disk is stored on the disk storing the parity sub-blocks. Furthermore, when the read data is located on the unavailable disk, the data sub-blocks are read directly from the disk storing the parity sub-blocks. Thus, according to various embodiments of the present disclosure, it is possible to reduce the amount of calculating parity sub-blocks when a disk of a disk array is unavailable, and may directly read data when the data is read, without a need to read other data sub-blocks and parity sub-blocks to calculate the data. This also reduces input and output operations and consumption on processor resources, and improves data processing efficiency.

Figure 1:
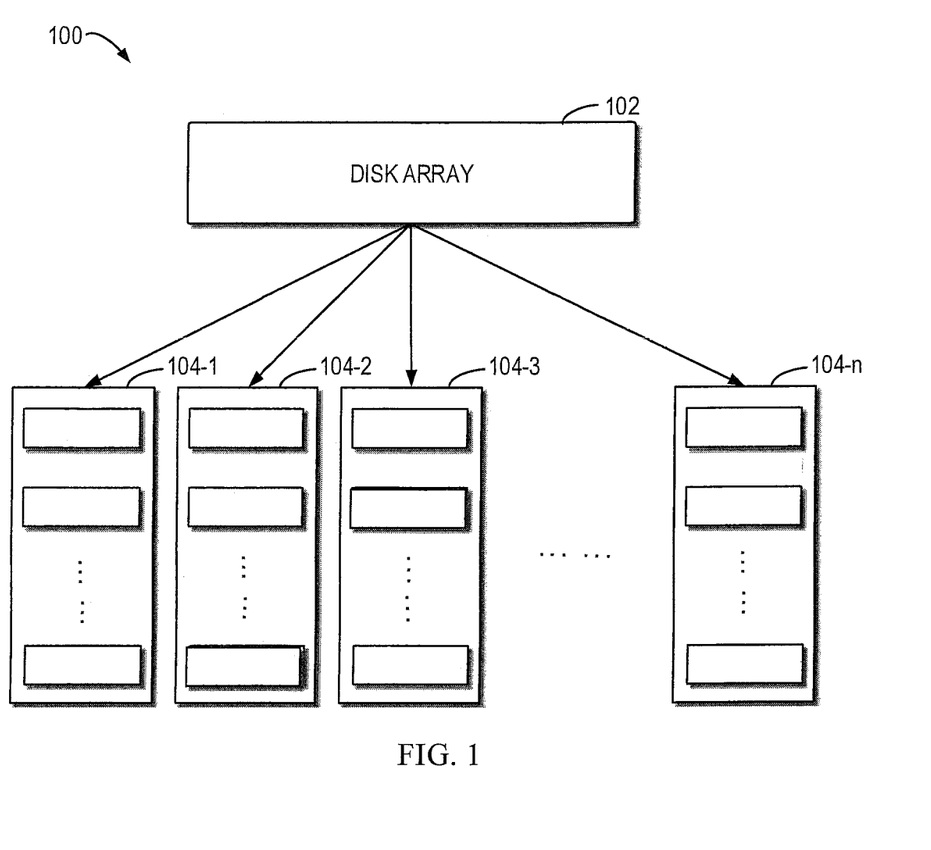
FIG. 1 illustrates a schematic diagram of a storage system 100 in which a device and/or a method according to embodiments of the present disclosure can be implemented.

FIG. 1 illustrates a schematic diagram of a storage system 100 in which a device and/or a method according to embodiments of the present disclosure can be implemented. As shown in FIG. 1, the storage system 100 includes a disk array 102. In one example, the disk array 102 may be a redundant array of independent disks (RAID). In another example, the disk array 102 may be any suitable type of disk array. The disk array 102 has a predetermined width. The width of the disk array 102 refers to the number of disks that make up a stripe in the disk array 102. The width of the disk array 102 is m+n, where m and n are positive integers, m represents the number of disks used for a data portion in the stripe, and n represents the number of disks used for a parity portion in the stripe. For example, a RAID 5 of the disk array 102 having a width of 4+1 indicates that the number of disks constituting the stripe of the RAID 5 is 4+1, including 4 disks for storing data, and one disk for storing parity data. The above examples are only for purpose of illustration rather than specifically limiting the scope of the present disclosure. Those skilled in the art may set the disk array in any available form based on needs.

The disk slices of the disk array 102 come from a plurality of disks. In FIG. 1, the disk array 102 and disk slices are from disks 104-1, 104-2, 104-3, . . . , 104-n collectively referred to as disk 104 for ease of description, where n is a positive integer. In one example, each disk 104 is divided into one or more fixed-size disk slices. The above examples are only for purpose of illustration rather than specifically limiting the scope of the present disclosure. Those skilled in the art may divide the disk slices according to needs.

Disk slices from different disks 104 may be used to form one or more disk arrays. In one embodiment, the disk slices in the disk array 102 may come from five disks when a width of the disk array is 4+1. A stripe for storing data is formed in the disk array 102. The stripe includes a data portion for storing data sub-blocks and a parity portion for storing parity sub-blocks.

In one example, if a width of a disk array is 4+1, then one stripe has four data portions and one parity portion. The four data portions are used for storing four data sub-blocks, and one parity portion is used for storing the parity sub-blocks obtained from the four data sub-blocks. The four data portions and one parity portion are respectively located on five different disks. In one embodiment, a size of the stripe is 2M, used for storing 2M data. The above examples are only for purpose of illustration rather than specifically limiting the scope of the present disclosure. Those skilled in the art may set formats and sizes of stripes according to needs.

Figure 2:
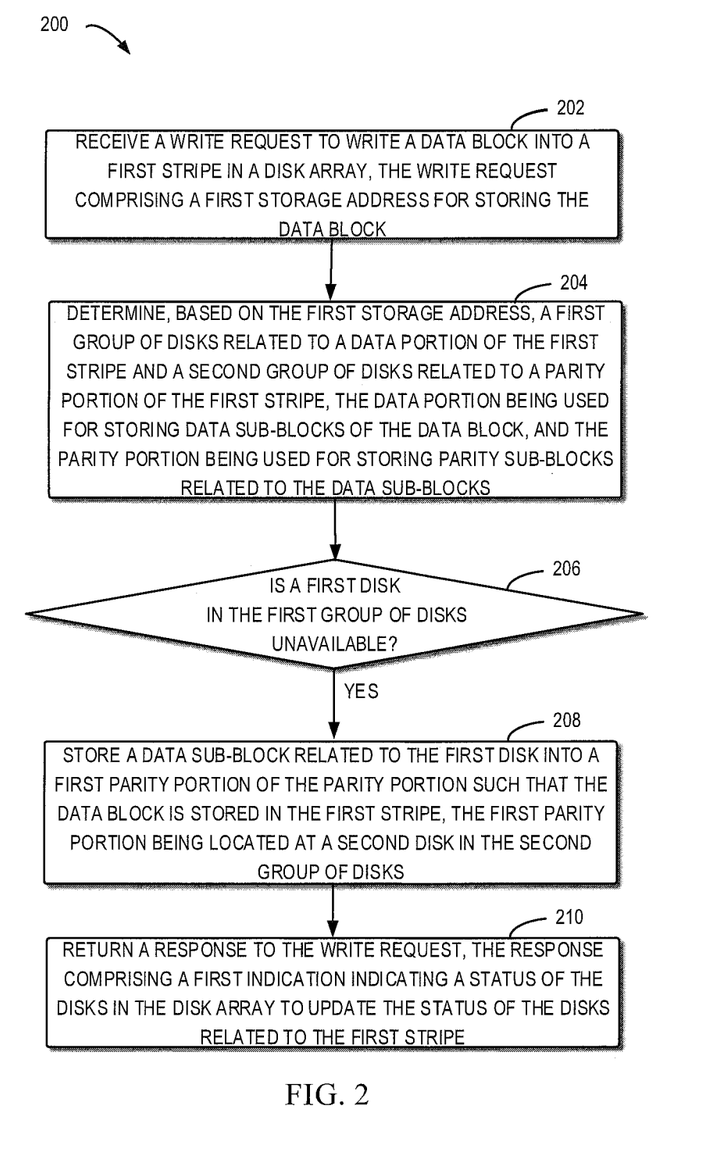
FIG. 2 illustrates a flow chart of a process 200 of writing a data block according to an embodiment of the present disclosure.
Figure 3:
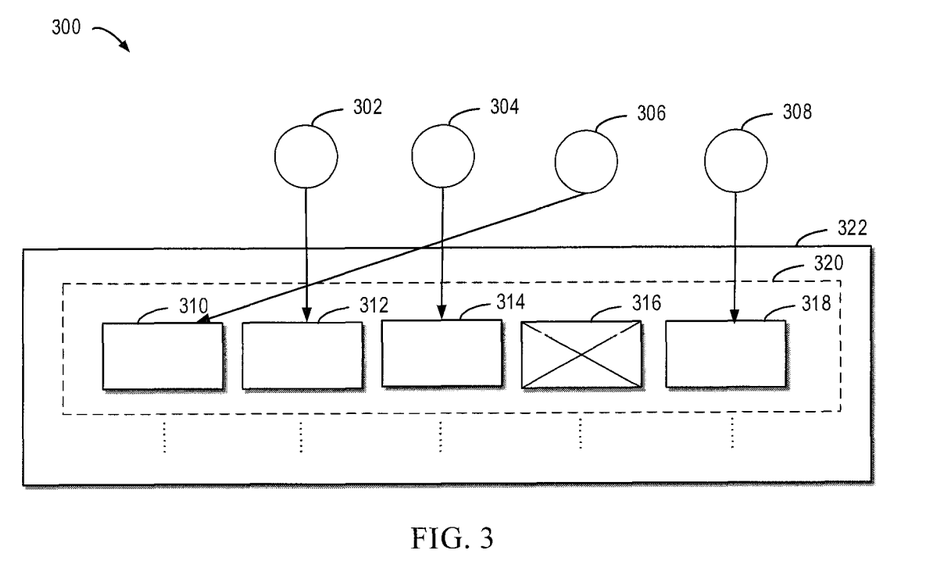
FIG. 3 illustrates a schematic diagram of a mapping 300 between a data block in a write operation and a stripe of a disk array according to an embodiment of the present disclosure.

The schematic diagram of the storage system 100 in which a device and/or a method according to embodiments of the present disclosure can be implemented is described above with reference to FIG. 1, and a process of writing a data block in accordance with an embodiment of the present disclosure is described below with reference to FIGS. 2 and 3. FIG. 2 illustrates a flow chart of a process 200 of writing a data block according to an embodiment of the present disclosure; FIG. 3 illustrates a schematic diagram of a mapping 300 between a data block in a write operation and a stripe of a disk array according to an embodiment of the present disclosure.

As shown in FIG. 2, at block 202, a disk array, such as the disk array 102 shown in FIG. 1, receives a write request to write a data block to a stripe in the disk array, the write request including a first storage address for storing the data block. For convenience of description, the stripe to which the write request is directed is also referred to as a first stripe. The first storage address is a storage address of the first stripe for storing the data block. It should be noted that the disk array 102 of a storage system 100 shown in FIG. 1 is merely one example of the disk array in which the process 200 may be performed, and this process may also be applied to any other suitable disk array.

When the data is written to the disk array, it is usual that an entire stripe is written. In one example, if one stripe may store 2M data, the 2M data is written at one time. The above examples are only for purpose of illustration rather than specifically limiting the scope of the present disclosure. Those skilled in the art may set the amount of data written into the stripe according to needs.

For example, in an example of stripe 320 of a disk array 322 shown in FIG. 3, when the disk array 322 is in a 4+1 format, the disk array 322 may receive a request to write a data block, and the data block, when stored into the stripe 320, is divided into data sub-blocks 302, 304, 306 and 308. This request includes address information for storing the data block, and this address information may be used to determine the stripe 320. Although FIG. 3 only takes the 4+1 format as an example, it could be understood that a format of the disk array where the stripe is located may be set in any suitable m+n format according to needs.

Returning now to FIG. 2 to continue description, at block 204, the disk array determines, based on the first storage address, a first group of disks related to a data portion of the first stripe and a second group of disks related to a parity portion of the first stripe. The data portion is used for storing data sub-blocks of the data block, and the parity portion is used for storing parity sub-blocks related to the data sub-blocks. For example, in the example of FIG. 3, four disks (corresponding to the first group of disks) where data portions 312, 314, 316 and 318 of the stripe 320 lie and one disk (corresponding to the second group of disks) where the parity portion 310 of the stripe lie may be determined based on the storage address for storing the data block in the received write request, namely, a stripe address for the stripe 320.

In block 204, the disk array may determine the first and the second groups of disks in any suitable manner according to needs.

In one embodiment, the disk array may obtain the first storage address for storing data blocks. The disk array may determine, based on the first storage address, a plurality of disks related to the first stripe. The disk array may also obtain a width of the disk array and a type of the disk array. Then, the disk array may determine, based on the first storage address, the width of the disk array and the type of the disk array, that the data portion of the stripe is located on one group of disks of the plurality of disks, and the parity portion of the stripe is located on another group of disks of the plurality of disks.

In some embodiments, upon receiving the data block to be stored, the disk array will divide the data block into data sub-blocks. In one example, the disk array receives, from a mapper, a request to write the data block, and the data block may be written all over the entire stripe.

At block 206, it is determined whether each of the plurality of disk in the first group of disks used for storing the data sub-blocks in the data block is unavailable. If a particular disk is unavailable, the unavailable disk may be referred to as the first disk for convenience of description.

For example, in the example shown in FIG. 3, the stripe 320 has four data portions 312, 314, 316 and 318 for storing data sub-blocks 302, 304, 306 and 308. If a disk on which the data portion 316 is located (corresponding to the first disk) is unavailable, the data portion 316 cannot be used for storing the data sub-block 306.

Returning now to FIG. 2, the description continues. If the first disk used for storing the data sub-block is unavailable, then at block 208, the data sub-block related to the first disk is stored on one of the second group of disks related to the parity portion of the stripe. For convenience of description, the disk of the second group of disks may be referred to as a second disk. Then, other data sub-blocks are stored in other disks other than the first disk in the first group of disks to store the data block into the first stripe.

For example, as shown in FIG. 3, the data sub-block 306 should be stored to the data portion 316, but if the first disk where the data portion 316 is located is unavailable, then the data sub-block 306 needs to be stored on the parity portion 310 of the second disk.

At block 210, the disk array returns a response to the write request, where the response includes a first indication indicating a status of the disks in the disk array to update the status of the disks related to the first stripe. In one example, the disk array sends, to a sender who sent the write request, indication information indicating the status of the disks related to the stripe (e.g., a mapper for managing the disk array).

In some embodiments, the indication information may include a bit corresponding to the disk of the stripe, storing 0 on the bit indicates that the disk corresponding thereto is available, and storing 1 on the bit indicates that the disk corresponding thereto is unavailable. The above examples are only for purpose of illustration rather than limiting the scope of the present disclosure. Those skilled in the art may set the form of the first indication indicating the state of the disk according to needs.

With the above method, the data sub-block is written directly into the parity portion for the stripe in a presence of the unavailable disk, while the parity sub-blocks of the data sub-blocks are not calculated and stored. This method reduces a use of processor resources and improves utilization rate of the processor.

In some embodiments, if the stripe of the disk array has a plurality of parity portions located on the plurality of disks, when there is a third disk that is unavailable in the first group of disks, the data sub-blocks related to the third disk are stored into a second parity portion of the parity portions, and the second parity portion is related to a fourth disk in the second group of disks. In order to ensure correctness of data, a first number of unavailable disks in the first group of disks is not greater than a second number of disks in the second group of disks. That is, the number of disks that are unavailable for storing data sub-blocks cannot be greater than the number of disks for storing parity sub-blocks. It is because if the number of unavailable disks for storing data sub-blocks is larger than the number of disks for storing parity sub-blocks, then a recovery of data cannot be ensured.

With the above method, when there is a plurality of parity portions in a format of a disk array, data blocks may be saved even if there are other unavailable data portions so that reliability of the data is ensured.

The process for writing a data block of FIG. 2 is already described above with reference to FIG. 3. Then, a flowchart of a process 400 of reading data according to an embodiment of the present disclosure will be described with reference to FIG. 4.

Figure 4:
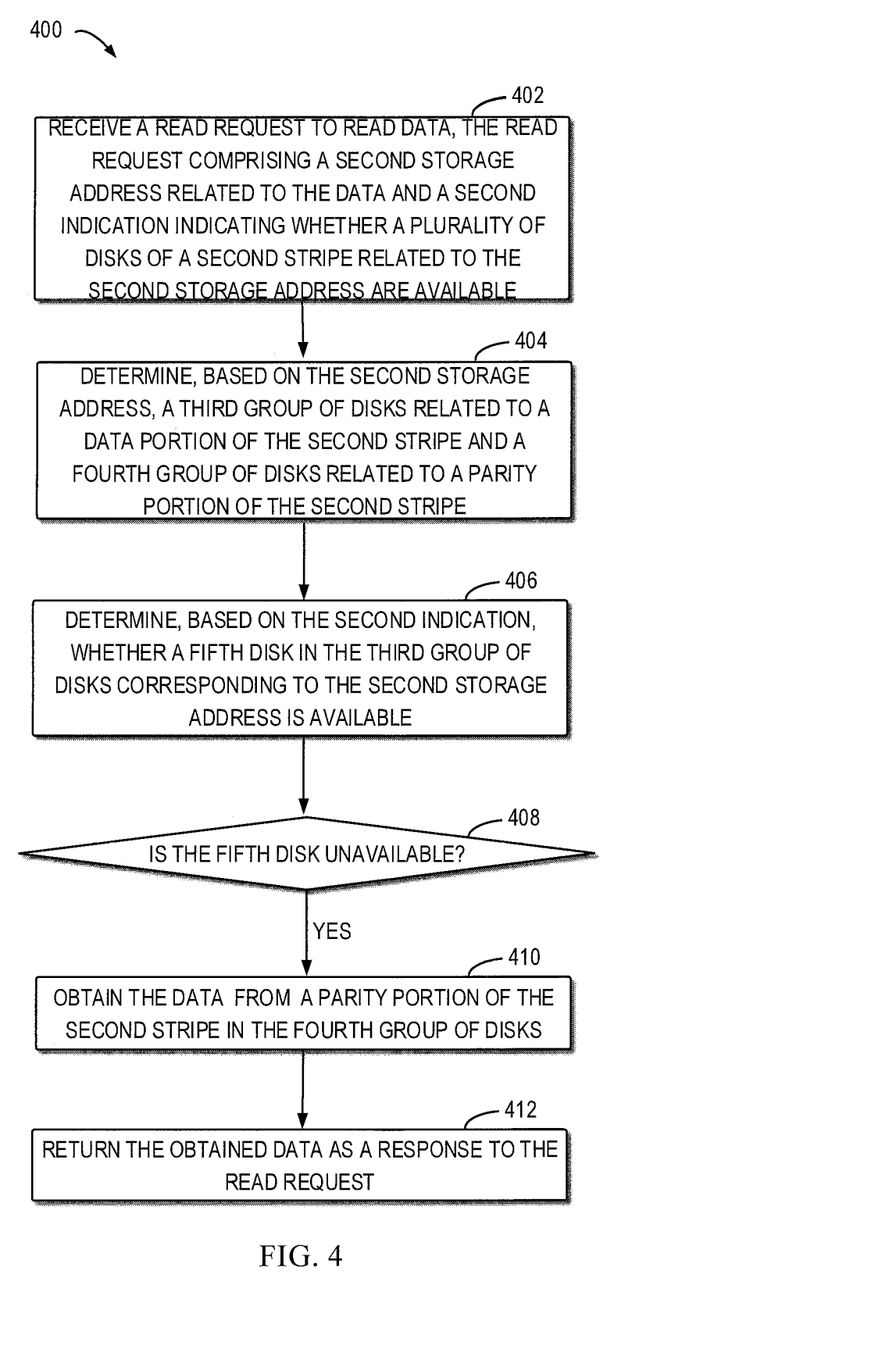
FIG. 4 illustrates a flow chart of a process 400 of reading data according to an embodiment of the present disclosure.

As shown in FIG. 4, at block 402, a disk array, such as the disk array 102 of FIG. 1, receives a read request to read data, and the read request includes a second storage address related to data to be read and a second indication indicating whether a plurality of disks of the second stripe related to the second storage address is available.

When the data is read, it is necessary to obtain not only the storage address of the data as well as indication information indicating whether the disk related to the stripe where the data to be read is located is available. As described in the write request, when the write of the data is completed, indication information about an availability of the disk related to the written stripe is returned to a sender of the write request. When the data is read, this indication information will be received.

At block 404, the disk array determines, based on the second storage address, a third group of disks related to a data portion of the second stripe and a fourth group of disks related to a parity portion of the second stripe.

In some embodiments, a disk array, such as the disk array 102 in FIG. 1, obtains the second storage address. The disk array may determine, based on the second storage address, a plurality of disks related to the second stripe. The disk array may also obtain a width of the disk array and a type of disk array. Then, the disk array may determine, based on the second storage address, the width of the disk array and the type of disk array, that the data portion of the stripe is located on a group of disks of the plurality of disks, and a parity portion of the stripe is located on another group of disks in the plurality of disks. The above examples are only for purpose of illustration rather than specifically limiting the scope of the present disclosure.

At block 406, the disk array determines, based on the second indication, whether a fifth disk in the third group of disks corresponding to the second storage address is available. When data is to be read, the disk array will detect the second indication to determine if there is an unavailable disk.

In some embodiments, the second stripe may be the abovementioned first stripe, and the second indication may be the abovementioned first indication. Continued reference may be made to the example of FIG. 3. For example, in the example of FIG. 3, the indication (corresponding to the second indication) for the stripe 320 (corresponding to the second stripe) which is included in the read request received by the disk array 322 may be an indication (corresponding to the first indication) returned when a write operation is performed for the stripe 320. Therefore, it may be determined from the indication that the data portion 316 of the stripe 320 is unavailable. In some embodiments, the second stripe is different from the previous first stripe and the second indication is different from the previous first indication. The above examples are only for purpose of illustration rather than specifically limiting the scope of the present disclosure.

Returning now to FIG. 4, the description continues. At block 408, it is determined if the fifth disk is unavailable. If it is determined, based on the second indication, that the fifth disk is unavailable, the data is obtained from the parity portion of the second stripe of the fourth group of disks at block 410.

For example, in the example of FIG. 3, the data may be read from the parity portion 310 of the stripe 320 when it is determined that the disk (corresponding to the fifth disk) where the data portion 316 of the stripe 320 is located is unavailable.

In some embodiments, if the read data further includes data located on other sub-blocks of the second stripe, the data are read together. Alternatively or additionally, the read request includes a length of data to be read. Therefore, it may be determined which data portions of the second stripe the data to be read is located. The above examples are only for purpose of illustration rather than specifically limiting the scope of the present disclosure. Those skilled in the art may obtain data in any suitable manner according to needs.

At block 412, the obtained data is returned as a response to the read request. After the data is obtained, the obtained data is returned to a requester.

With the above method, when the data on the unavailable disk related to the stripe is read, the data may be obtained directly by reading data from the parity portion of the stripe, without performing operations for the data sub-blocks and parity sub-blocks in other data portions of the stripe. Such operation reduces the number of data input and output operations, reduces the amount of computation of a processor, and improves a resource utilization rate.

The flowchart of the process 400 for reading data according to an embodiment of the present disclosure shown in FIG. 4 is described above with reference to FIG. 3. A flow chart of a process 500 of rebuilding a disk array according to an embodiment of the present disclosure shown in FIG. 5 will be described below.

Figure 5:
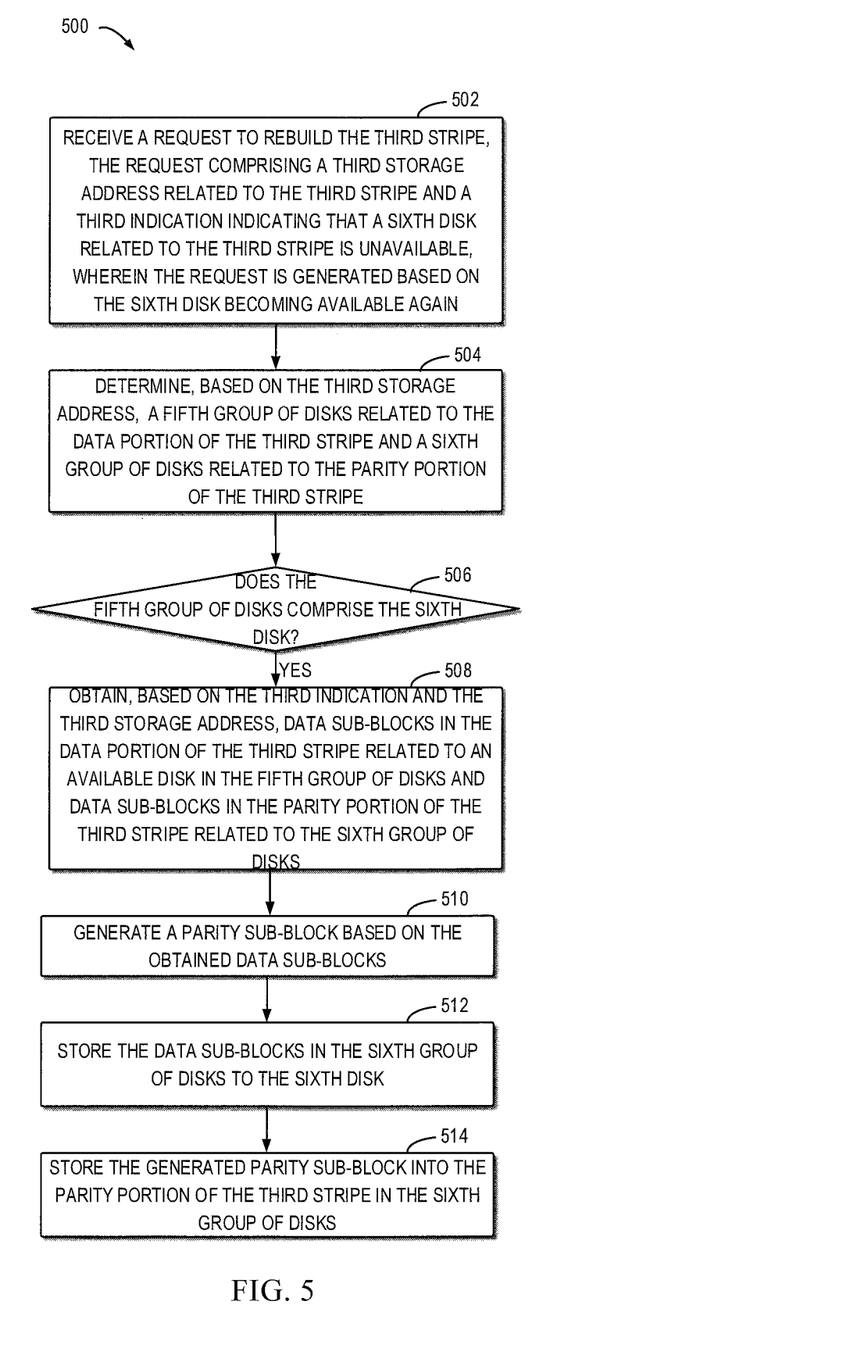
FIG. 5 illustrates a flow chart of a process 500 of rebuilding a disk array according to an embodiment of the present disclosure.

As shown in FIG. 5, when an unavailable disk related to a disk array, such as the disk array 102 in FIG. 1, becomes available again, the disk array will receive a request to rebuild a stripe at block 502. This stripe is referred to as a third stripe for convenience of description. The third stripe may be one stripe or a plurality of stripes. In some embodiments, the request includes a storage address related to the third stripe and an indication indicating that a sixth disk related to the third stripe is unavailable. For convenience of description, the storage address is also referred to as a third storage address, and the indication is also referred to as a third indication. Alternatively or additionally, there is one storage address and one indication for each stripe. The request is generated based on the sixth disk becoming available again.

To further describe this process in more detail, the process will be described below in conjunction with a mapping 600 between a data block and a stripe of the disk array shown in FIG. 6. In a disk array 624 shown in FIG. 6, if a write operation has been performed for a strip 622 during unavailability of a disk related to a data portion 608 of the stripe 622 (corresponding to the third stripe), then a request to rebuild the stripe 622 will be received when the disk becomes available again. The request includes a storage address related to the stripe 622 and an indication indicating whether the disk related to the stripe 622 is available. Since the write operation is performed when the data portion 608 is unavailable, the indication may indicate that the disk (corresponding to the sixth disk) where the data portion 608 is located is unavailable.

At block 504, the disk array determines, based on the third storage address, a group of disks related to a data portion of the third stripe and another group of disks related to a parity portion of the third stripe. For convenience of description, this group of disks and another group of disks are referred to as a fifth and a sixth groups of disks.

In some embodiments, the disk array obtains a third storage address. The disk array may determine, based on the third storage address, a plurality of disks related to the third stripe. The disk array may also obtain a width of the disk array and a type of disk array. Then, the disk array determines, based on the third storage address, the width of the disk array and the type of disk array, the fifth group of disks where the data portion of the stripe is located and the sixth group of disks where the parity portion of the stripe is located.

Figure 6:
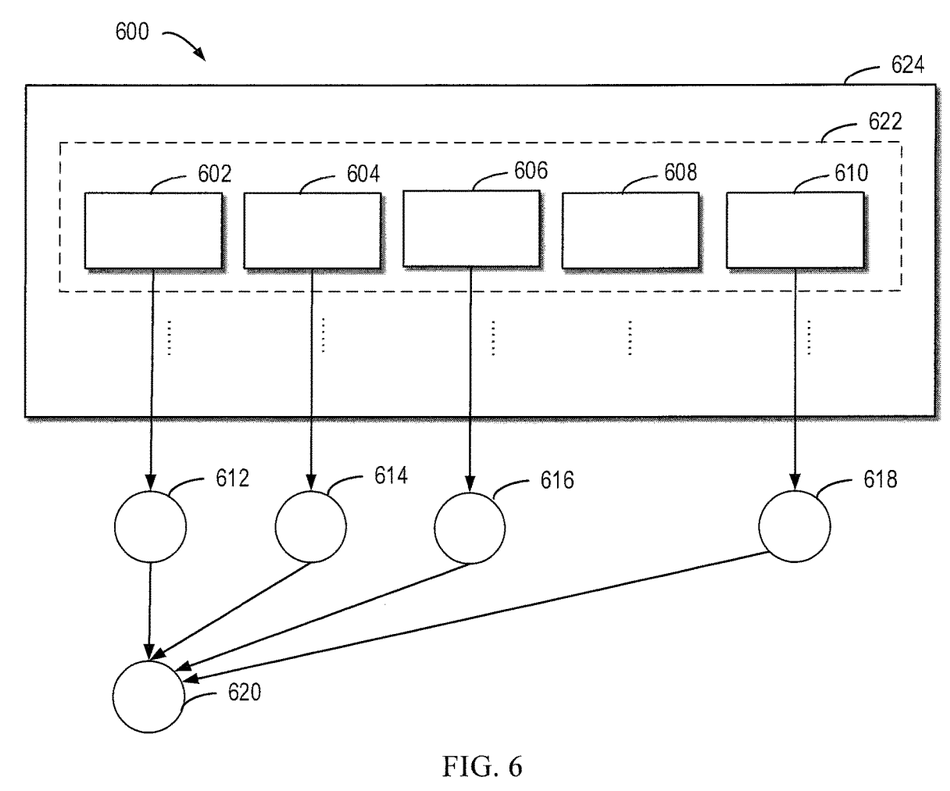
FIG. 6 illustrates a schematic diagram of a mapping 600 between a data block and a stripe of a disk array when a disk array is rebuilt according to an embodiment of the present disclosure.

For example, in FIG. 6, the disk array 624 may determine, based on the received storage address related to the stripe 622, a group of disks (corresponding to the fifth group of disks) where the data portions 604, 606, 608 and 610 of the stripe 622 are located and a group of disks (corresponding to the sixth group of disks) where the parity portion 602 is located. Since the disk array in FIG. 6 is in a 4+1 format, the group of disks where the parity portion 602 is located is one disk. In other examples, if the disk array is in a m+n format, the stripe has n parity portions, and the n disks where the n parity portions are located correspond to the sixth group of disks.

At block 506, the disk array determines whether the fifth group of disks includes the sixth disk that is available again. As shown in FIG. 6, the disk array 624 determines that the disk (corresponding to the sixth disk) of the group of disks (corresponding to the fifth group of disks) in which the data portions 604, 606, 608 and 610 of the stripe 622 are located, which includes the data portion 608, is available again.

At block 508, obtain, based on the third indication and the third storage address, data sub-blocks in the data portion of the third stripe related to an available disk in the fifth group of disks and data sub-blocks in the parity portion of the third stripe related to the sixth group of disks. For example, in the example of FIG. 6, data sub-blocks 612, 614, 616 and 618 may be obtained from the parity portion 602, data portions 604, 606 and 610 of stripe 622.

Returning to FIG. 5, at block 510, a parity sub-block is generated based on the obtained data sub-blocks. For example, in the example of FIG. 6, a parity sub-block 620 is generated based on the obtained data sub-blocks 612, 614, 616 and 618. In some embodiments, the parity sub-block is generated by performing XOR operation on the obtained data sub-block.

At block 512, the data sub-blocks in the sixth group of disks are stored into the sixth disk. For example, in the example of FIG. 6, the sixth group of disks is the disk where the parity portion 602 is located, and the sixth disk may be the disk where the data portion 608 is located. Since the disk where the data portion 608 is located is available again, the data sub-block 612 in the parity portion 602 of the sixth group of disks is stored to the data portion 608 of the recovered stripe.

At block 514, the generated parity sub-block is stored to the parity portion of the third stripe in the sixth group of disks. For example, in the example of FIG. 6, the generated parity sub-block 620 is stored into the parity portion 602 of the stripe 622.

With the above method, it is possible to recover only the stripe on which the write operation has been performed during unavailability of the recovered disk, without processing all the stripes, thereby reducing input and output operations and a use of an amount of computing resources, and increasing efficiency of rebuilding the disk array.

Figure 7:
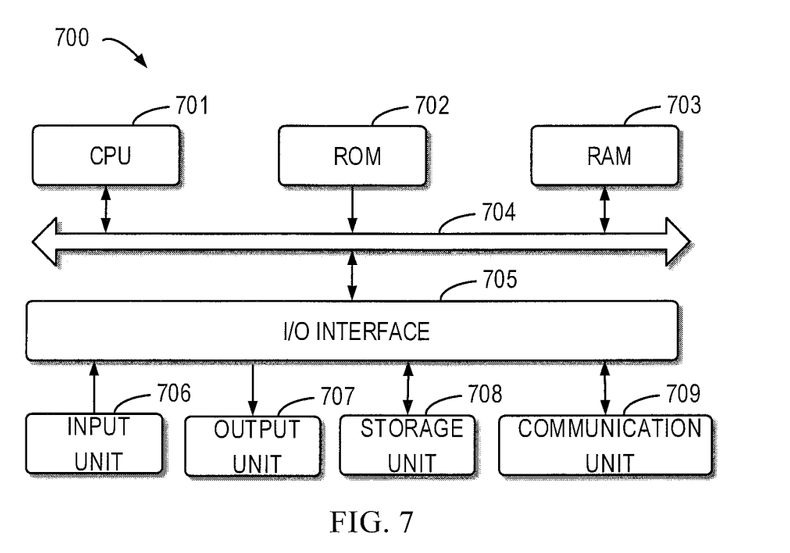
FIG. 7 illustrates a block diagram of an example device 700 adapted to implement an embodiment of the present disclosure.

FIG. 7 illustrates a schematic block diagram of an example device 700 that may be used to implement an embodiment of the present disclosure. For example, any one of 102 and 104 shown in FIG. 1, 322 shown in FIGS. 3 and 624 shown in FIG. 6 may be implemented by the device 700. As shown, the device 700 includes a central processing unit (CPU) 701 which is capable of performing various proper actions and processes in accordance with computer program instructions stored in a read only memory (ROM) 702 or computer program instructions loaded from a storage unit 708 to a random access memory (RAM) 703. Various programs and data needed in the operation of the device 700 may also be stored in the RAM 703. The CPU 701, the ROM 702 and the RAM 703 are connected to one another via a bus 704. An input/output (I/O) interface 705 is also connected to the bus 704.

The following components in the device 700 are connected to the I/O interface 705: an input unit 706 including a keyboard, a mouse, or the like; an output unit 707, e.g., various displays and loudspeakers; a storage unit 708 such as a magnetic disk, an optical disk or the like; and a communication unit 709 such as a network card, a modem, a radio communication transceiver. The communication unit 709 allows the device 700 to exchange information/data with other devices via a computer network such as Internet and/or various telecommunication networks.

The above-described procedures and processes such as the methods 200, 400 and 500 may be implemented by the processing unit 701. For example, in some embodiments, the methods 200, 400 and 500 may be implemented as a computer software program, which is tangibly included in a machine-readable medium such as the storage unit 708. In some embodiments, part or all of the computer program may be loaded and/or installed on the device 700 via the ROM 702 and/or the communication unit 709. When the computer program is uploaded to the RAM 703 and executed by the CPU 701, one or more steps of the above methods 200, 400 or 500 may be implemented.

The present disclosure may be a method, a device, a system and/or a computer program product. The computer program product may include a computer readable storage medium (or media) having computer readable program instructions stored thereon for carrying out aspects of the present disclosure.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer or entirely on a remote computer or a server. In the latter scenario, the remote computer may be connected to a user's computer through any type of network, including a local area network (LAN) or a wide area network (WAN), or the connection may be made to an external computer (for example, through the Internet using an Internet Service Provider). In some embodiments, an electronic circuitry including, for example, a programmable logic circuitry, a field-programmable gate arrays (FPGA), or a programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the present disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible embodiments of systems, methods and computer program products according to various embodiments of the present disclosure. In this regard, each block in the flowchart or block diagrams may represent a module, a segment, or a portion of code, which includes one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in a reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. Terminologies used herein were chosen to best explain principles of the embodiments, the practical application or technical improvement over technologies found in a marketplace, or to enable others of ordinary skill in the art to understand the embodiments disclosed herein.

As disclosed herein, it is possible to reduce the number of input and output operations, decrease a use of a processor, and improve utilization rate of resources.

We claim:

1. A method of managing data, comprising:
receiving a write request to write a data block into a first stripe in a disk array, the write request comprising a first storage address for storing the data block;
determining, based on the first storage address, a first group of disks related to a data portion of the first stripe and a second group of disks related to a parity portion of the first stripe, the data portion being used for storing data sub-blocks of the data block, and the parity portion being used for storing parity sub-blocks related to the data sub-blocks;
in response to a first disk in the first group of disks being unavailable, storing a data sub-block related to the first disk into a first parity portion of the parity portion such that the data block is stored in the first stripe, the first parity portion being located at a second disk in the second group of disks; and
returning a response to the write request, the response comprising a first indication indicating a status of the disks in the disk array to update the status of the disks related to the first stripe,
wherein receiving the write request includes the disk array receiving the write request from a subsystem,
wherein returning the response includes the disk array providing the response, including the first indication, to the subsystem,
wherein the method further comprises the subsystem updating the status of the disks related to the first stripe based on the first indication, and
wherein the method further comprises:
receiving a request from the subsystem to rebuild the first stripe, the request including the first indication;
determining, based on the first indication, the status of the disks related to the first stripe;
obtaining a set of data sub-blocks corresponding to the first stripe:
generating a parity sub-block based on the obtained set of data sub-blocks: and
storing the generated parity sub-block.

2. The method according to claim 1, wherein determining the first group of disks and the second group of disks comprises:
dividing the data block into data sub-blocks.

3. The method according to claim 1, wherein determining the first group of disks and the second group of disks comprises:
determining, based on the first storage address, a plurality of disks related to the first stripe;
obtaining a width of the disk array and a type of the disk array; and
determining, based on the first storage address, the width, and the type, the plurality of disks as the first group of disks and the second group of disks.

4. The method according to claim 1, wherein storing the data sub-block related to the first disk into a first parity portion of the parity portion comprises:
in response to a third disk in the first group of disks being unavailable, storing a data sub-block related to the third disk into a second parity portion of the parity portion, the second parity portion being related to a fourth disk in the second group of disks,
wherein a first number of unavailable disks in the first group of disks is not greater than a second number of disks in the second group of disks.

5. The method according to claim 1, further comprising:
receiving a read request to read data, the read request comprising a second storage address related to the data and a second indication indicating whether a plurality of disks of a second stripe related to the second storage address are available;
determining, based on the second storage address, a third group of disks related to a data portion of the second stripe and a fourth group of disks related to a parity portion of the second stripe;
determining, based on the second indication, whether a fifth disk in the third group of disks corresponding to the second storage address is available;
in response to determining that the fifth disk is unavailable, obtaining the data from a parity portion of the second stripe in the fourth group of disks; and
returning the obtained data as a response to the read request.

6. The method according to claim 1, further comprising:
receiving a request to rebuild a third stripe, the request comprising a third storage address related to the third stripe and a third indication indicating that a sixth disk related to the third stripe is unavailable, wherein the request is generated based on the sixth disk becoming available again;
determining, based on the third storage address, a fifth group of disks related to a data portion of the third stripe and a sixth group of disks related to a parity portion of the third stripe;
in response to the fifth group of disks comprising the sixth disk, obtaining, based on the third indication and the third storage address, data sub-blocks in the data portion of the third stripe related to an available disk in the fifth group of disks and data sub-blocks in the parity portion of the third stripe related to the sixth group of disks;
generating a parity sub-block based on the obtained data sub-blocks;
storing the data sub-blocks in the sixth group of disks to the sixth disk; and
storing the generated parity sub-block into the parity portion of the third stripe in the sixth group of disks.

7. The method of claim 1, further comprising:
receiving a read request from the subsystem to read data stored in the first stripe, the read request including the first indication as updated by the subsystem;
determining, based on the first indication, the status of the disks related to the first stripe;
in response to the first indication indicating that the first parity portion stores a data sub-block related to the first disk, obtaining the data sub-block related to the first disk from the first parity portion;
returning the obtained data as a response to the read request.

8. An electronic device for managing data, the electronic device comprising:
a processor; and
a memory storing computer program instructions, the processor running the computer program instructions in the memory to control the electronic device to perform acts comprising:
receiving a write request to write a data block into a first stripe in a disk array, the write request comprising a first storage address for storing the data block;
determining, based on the first storage address, a first group of disks related to a data portion of the first stripe and a second group of disks related to a parity portion of the first stripe, the data portion being used for storing data sub-blocks of the data block, and the parity portion being used for storing parity sub-blocks related to the data sub-blocks;

in response to a first disk in the first group of disks being unavailable, storing a data sub-block related to the first disk into a first parity portion of the parity portion such that the data block is stored in the first stripe, the first parity portion being located at a second disk in the second group of disks; and returning a response to the write request, the response comprising a first indication indicating a status of the disks in the disk array to update the status of the disks related to the first stripe, wherein the acts further comprise:

receiving a request to rebuild a third stripe, the request comprising a third storage address related to the third stripe and a third indication indicating that a sixth disk related to the third stripe is unavailable, wherein the request is generated based on the sixth disk becoming available again;

determining, based on the third storage address, a fifth group of disks related to a data portion of the third stripe and a sixth group of disks related to a parity portion of the third stripe;

in response to the fifth group of disks comprising the sixth disk, obtaining, based on the third indication and the third storage address, data sub-blocks in the data portion of the third stripe related to an available disk in the fifth group of disks and data sub-blocks in the parity portion of the third stripe related to the sixth group of disks;

generating a parity sub-block based on the obtained data sub-blocks;

storing the data sub-blocks in the sixth group of disks to the sixth disk; and storing the generated parity sub-block into the parity portion of the third stripe in the sixth group of disks.

9. The electronic device according to claim 8, wherein determining the first group of disks and the second group of disks comprises:

dividing the data block into data sub-blocks.

10. The electronic device according to claim 8, wherein determining the first group of disks and the second group of disks comprises:

determining, based on the first storage address, a plurality of disks related to the first stripe;

obtaining a width of the disk array and a type of the disk array; and determining, based on the first storage address, the width, and the type, the plurality of disks as the first group of disks and the second group of disks.

11. The electronic device according to claim 8, wherein storing the data sub-blocks related to the first disk in a first parity portion of the parity portion comprises:

in response to a third disk in the first group of disks being unavailable, storing a data sub-block related to the third disk into a second parity portion of the parity portion, the second parity portion being related to a fourth disk in the second group of disks, wherein a first number of unavailable disks in the first group of disks is not greater than a second number of disks in the second group of disks.

12. The electronic device according to claim 8, the acts further comprising:

receiving a read request to read data, the read request comprising a second storage address related to the data and a second indication indicating whether a plurality of disks of a second stripe related to the second storage address are available;

determining, based on the second storage address, a third group of disks related to a data portion of the second stripe and a fourth group of disks related to a parity portion of the second stripe;

determining, based on the second indication, whether a fifth disk in the third group of disks corresponding to the second storage address is available;

in response to determining that the fifth disk is unavailable, obtaining the data from a parity portion of the second stripe in the fourth group of disks; and returning the obtained data as a response to the read request.

13. A computer program product having a non-transitory computer readable medium which stores a set of instructions to manage data; the set of instructions, when carried out by computerized circuitry, causing the computerized circuitry to perform a method of:

receiving a write request to write a data block into a first stripe in a disk array, the write request comprising a first storage address for storing the data block;

determining, based on the first storage address, a first group of disks related to a data portion of the first stripe and a second group of disks related to a parity portion of the first stripe, the data portion being used for storing data sub-blocks of the data block, and the parity portion being used for storing parity sub-blocks related to the data sub-blocks;

in response to a first disk in the first group of disks being unavailable, storing a data sub-block related to the first disk into a first parity portion of the parity portion such that the data block is stored in the first stripe, the first parity portion being located at a second disk in the second group of disks; and returning a response to the write request, the response comprising a first indication indicating a status of the disks in the disk array to update the status of the disks related to the first stripe, wherein receiving the write request includes the disk array receiving the write request from a subsystem, wherein returning the response includes the disk array providing the response, including the first indication to the subsystem, wherein the method further comprises the subsystem updating the status of the disks related to the first stripe based on the first indication, and wherein the method further comprises:

receiving a request from the subsystem to rebuild the first stripe, the request including the first indication;

determining, based on the first indication, the status of the disks related to the first stripe;

obtaining a set of data sub-blocks corresponding to the first stripe;

generating a parity sub-block based on the obtained set of data sub-blocks; and storing the generated parity sub-block.

* * * * *